US009402131B2

(12) United States Patent
Jennings et al.

(10) Patent No.: US 9,402,131 B2
(45) Date of Patent: Jul. 26, 2016

(54) PUSH-PULL MICROPHONE BUFFER

(71) Applicant: Knowles Electronics, LLC, Itasca, IL (US)

(72) Inventors: Michael Jennings, Plano, TX (US); Craig Stein, Naperville, IL (US); Dean Badillo, New Lenox, IL (US)

(73) Assignee: KNOWLES ELECTRONICS, LLC, Itasca, IL (US)

( * ) Notice: Subject to any disclaimer, the term of this patent is extended or adjusted under 35 U.S.C. 154(b) by 0 days.

(21) Appl. No.: 14/279,493

(22) Filed: May 16, 2014

(65) Prior Publication Data

US 2015/0117675 A1 Apr. 30, 2015

Related U.S. Application Data

(60) Provisional application No. 61/897,488, filed on Oct. 30, 2013.

(51) Int. Cl.

| | |
|---|---|
| ***H04B 15/00*** | (2006.01) |
| ***H04R 3/00*** | (2006.01) |
| ***H04R 1/08*** | (2006.01) |
| ***G10L 21/0208*** | (2013.01) |
| ***H04R 3/02*** | (2006.01) |
| *H04R 25/00* | (2006.01) |

(52) U.S. Cl.

CPC ............ *H04R 3/002* (2013.01); *G10L 21/0208* (2013.01); *H04R 1/08* (2013.01); *H04R 3/00* (2013.01); *H04R 3/02* (2013.01); *H04R 25/50* (2013.01); *H04R 2201/003* (2013.01)

(58) Field of Classification Search

None

See application file for complete search history.

(56) References Cited

U.S. PATENT DOCUMENTS

| | | | |
|---|---|---|---|
| 4,592,087 | A | 5/1986 | Killion |
| 4,689,819 | A | 8/1987 | Killion |
| 5,083,095 | A | 1/1992 | Madaffari |
| 5,193,116 | A | 3/1993 | Mostardo |
| 5,337,011 | A | 8/1994 | French |
| 5,446,413 | A | 8/1995 | Loeppert |
| 5,559,892 | A | 9/1996 | Boor |

(Continued)

FOREIGN PATENT DOCUMENTS

KR 10-0587970 B1 6/2006

OTHER PUBLICATIONS

International Search Report and Written Opinion for PCT/US2014/038598, dated Sep. 26, 2014 (9 pages).

*Primary Examiner* — Muhammad N Edun

(74) *Attorney, Agent, or Firm* — Fitch, Even, Tabin & Flannery LLP

(57) ABSTRACT

A buffer is coupled to an acoustic motor. The buffer has an input and an output. The input has an input voltage and the output has an output voltage. The buffer is coupled to a load. The buffer includes an input transistor and push-pull transistor circuitry. The input transistor has a gate, a source, and a drain, a gate-to-source capacitance, and an area. The push-pull transistor circuitry is coupled to the input transistor. Under a first set of operating conditions, the gate to source voltage of the input transistor remains constant and the output voltage is a buffered copy of the input voltage. Under a second set of operating conditions, the push-pull transistor circuitry selectively sinks or sources additional current to the load so that linearity of buffer operation is provided. A gate-to-drain capacitance of the input transistor is buffered allowing the area of the input transistor to be increased without reducing the gain of the motor.

7 Claims, 3 Drawing Sheets

(56) References Cited

U.S. PATENT DOCUMENTS

| | | | | |
|---|---|---|---|---|
| 5,579,397 | A | 11/1996 | Ikeda et al. | |
| 5,861,779 | A | 1/1999 | Loeppert | |
| 5,966,645 | A | 10/1999 | Davis | |
| 6,066,985 | A | 5/2000 | Xu | |
| 6,307,944 | B1 | 10/2001 | Garratt | |
| 7,092,538 | B2 | 8/2006 | Potter | |
| 7,221,766 | B2 | 5/2007 | Boor | |
| 7,352,876 | B2 | 4/2008 | Boor | |
| 7,688,987 | B2 | 3/2010 | Boor | |
| 7,706,559 | B2 | 4/2010 | Collins | |
| 8,123,547 | B2 | 2/2012 | Miller | |
| 8,604,880 | B2 | 12/2013 | Boor | |
| 8,682,015 | B2 | 3/2014 | Miller | |
| 8,687,823 | B2 | 4/2014 | Loeppert | |
| 8,890,615 | B2 | 11/2014 | Boor | |
| 2003/0128856 | A1 | 7/2003 | Boor | |
| 2004/0179702 | A1 | 9/2004 | Boor | |
| 2004/0179703 | A1 | 9/2004 | Boor | |
| 2005/0078841 | A1* | 4/2005 | Boor ....................... | H03F 1/305 381/113 |
| 2005/0213787 | A1 | 9/2005 | Collins | |
| 2007/0217628 | A1 | 9/2007 | Boor | |
| 2010/0098284 | A1 | 4/2010 | Conklin | |
| 2013/0058506 | A1* | 3/2013 | Boor ....................... | H03F 3/185 381/122 |
| 2013/0170673 | A1* | 7/2013 | Shajaan ................. | H04R 1/005 381/122 |
| 2014/0097906 | A1 | 4/2014 | Jennings | |
| 2014/0112516 | A1 | 4/2014 | Jiles | |

* cited by examiner

PUSH-PULL MICROPHONE BUFFER

CROSS REFERENCE TO RELATED APPLICATIONS

This patent claims benefit under 35 U.S.C. §119 (e) to U.S. Provisional Application No. 61/897,488 entitled "Push-Pull Microphone Buffer" filed Oct. 30, 2013, the content of which is incorporated herein by reference in its entirety.

TECHNICAL FIELD

This application relates to acoustic devices and specifically to microphone buffers.

BACKGROUND

For Hearing Instrument (HI) applications (as well as other types of applications such as personal computers and cellular phones), it is typically desirable to provide a highly linear buffered signal from the microphone transducer while maintaining low static power consumption and a minimized input referred noise characteristic. The transducer can be either a subminiature electret or MEMS based transducer with a package footprint that is also minimized versus sensitivity and noise performance. The sensitivity and noise characteristics, and audio band distortion relate to the audio quality of the microphone while distortion from ultrasonic signals can produce audible artifacts through intermodulation of fundamental tones caused by multiple ultrasonic sources or Doppler Effect type frequency shifting. The second order intermodulation product caused by multiple sources in the ultrasonic frequency range is of concern since the difference frequency of tones caused by ultrasonic detectors currently available can demodulate into the audio band.

Ideally, the buffered signal is highly linear for all frequencies in the audio band and ultrasonic frequencies that the HI (or other device) is exposed to during the normal usage such as ultrasonic frequencies produced by ultrasonic detector systems, and so forth. Audio inputs and ultrasonic interferences can be very large amplitudes and the need to drive relatively large ac or dc loads is usually necessary. These loads can be electronic filters, either low pass, high pass, or both, for shaping the output frequency response or the load can be the input impedance to the HI (or other device) input circuitry. Driving these loads with large amplitudes and/or frequencies can demand very large peak currents which can distort the output signal if the peak current requirements cannot be provided within the linear range of the buffer whether by slew rate limiting of the buffer or large signal excursions from the bias point. Since the first buffer is implemented with transistors which are square law devices, the linear operating range represents a relatively small change in current relative to the bias point that is able to be delivered to the load.

HI (or other) applications also require good noise performance and high sensitivity at low quiescent current, so the challenge is to address ultrasonic interference while maintaining good noise performance and input buffer gain.

BRIEF DESCRIPTION OF THE DRAWINGS

For a more complete understanding of the disclosure, reference should be made to the following detailed description and accompanying drawings wherein.

Those of ordinary skill in the art will appreciate that elements in the figures are illustrated for simplicity and clarity. It will further be appreciated that certain actions and/or steps may be described or depicted in a particular order of occurrence while those of ordinary skill in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

In the present approaches, the area of input transistor is maximized to minimize flicker noise without loading the transducer motor and thus decreasing circuit gain. The present approaches also drive large signals into large capacitive and/or resistive loads and at potentially high frequencies. The present approaches also advantageously operate at low supply voltage (e.g., 1V) and low quiescent power consumption.

A buffer circuit is provided which is optimized for noise and gain and provides a push pull output drive to drive a large (e.g., LPF) capacitor in a single stage buffer configuration. This one stage buffer configuration provides minimum noise with a reduced current bias while allowing the buffer to maintain low output impedance and a relatively large linear output range.

Figure 1:
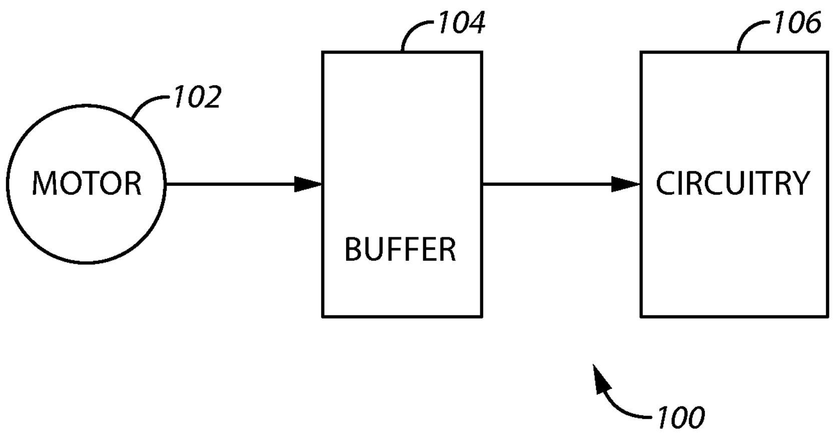
FIG. 1 is a block diagram of an acoustic system.

Referring now to FIG. 1, an acoustic system 100 includes a motor 102, a buffer 104, and circuitry 106. The motor 102 and the circuitry 106 may be disposed together in one assembly and together with the circuitry 106 are disposed in a device 108. The device 108 may be a personal computer, cellular phone, hearing instrument (HI), or any other device that utilizes the acoustic components described herein.

The motor 102 is an acoustic element that converts sound energy into an electrical signal. In these regards, the motor 102 may include a diaphragm, a back plate, or other elements. The motor 102 may be a microelectromechanical system (MEMS) device.

The buffer 104 includes circuitry that couples the motor 102 to the circuitry 106. The buffer 104 includes the motor 102 to the circuitry 106. The buffer 104, among other things may reduce noise (without loading the motor 102), drive large signals into loads in the circuitry 106, and operate at a low supply voltage.

The circuitry 106 may perform a variety of functions. This circuitry represents the load driven by the buffer 104. In one example, the circuitry 106 may be other circuitry in a HI, cellular phone, or computer. Other examples of circuitry 106 are possible.

Figure 2:
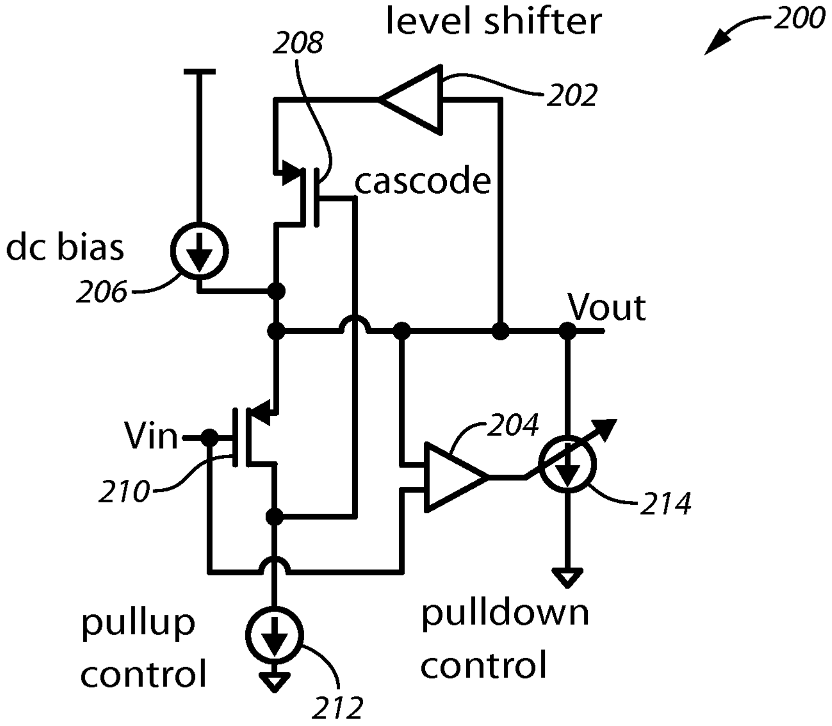
FIG. 2 is a block diagram of a buffer circuit.

Referring now to FIG. 2, one example of a buffer circuit or buffer 200 (e.g., the buffer circuit 104 of FIG. 1) is described. The buffer 200 includes a first amplifier 202, a second amplifier 204, a dc bias current source 206, a cascode transistor 208, an input transistor 210, a current source 212, and a pull down controller 214.

The source of the input transistor 210 is coupled to the gate of the cascode transistor 208. The first amplifier 202 is coupled to the drain of the cascode transistor 208 and acts as a level shifter. The gate of the input transistor 210 is coupled to Vin and the second amplifier 204. Vout is coupled to the first amplifier 202, the source of the cascode transistor 208, dc bias current source 206, the drain of the input transistor 210, and the second amplifier 204.

In operation, the circuit when unloaded an increase in Vin, the input transistor 210 turns off. The cascode transistor 208, consequently, has its gate voltage decrease causing the impedance of the cascode transistor 208 to decrease. Vout then increases. As Vout increases, the level shifter amplifier 202 pulls up (increases its voltage). The voltage at the gate of the cascode transistor 208 increases the capacitance at the gate of the input transistor 210 guards out (approaches infinity or an open circuit). Consequently, the input transistor 210 is not loaded down and can be increased in size. Noise is decreased and the signal-to-noise ratio (S/N) increases.

In one example, the gate area of the input transistor is increased compared to conventional transistors. It will be appreciated that further increases in area can also be achieved. By "area," it is meant total width*length.

In another example, Vout does not track Vin. In some applications (e.g., ultrasonic) a great amount of current is needed from the buffer 200. The buffer 200 examines whether Vout and Vin are different. If Vout/Vin changes, this increases the gate to source voltage (Vgs) of the input transistor 210, activating the pull down controller 214 to sink the current. This action provides more sinking current when needed. This pull-up current source 212 sources current when needed. In these regards, if Vout decreases relative to Vin, the input transistor 210 turns off, and the voltage at the gate of the cascode transistor 208 decreases.

In this way, large signals can be driven into capacitive and resistive loads at potentially high frequencies.

Figure 3:
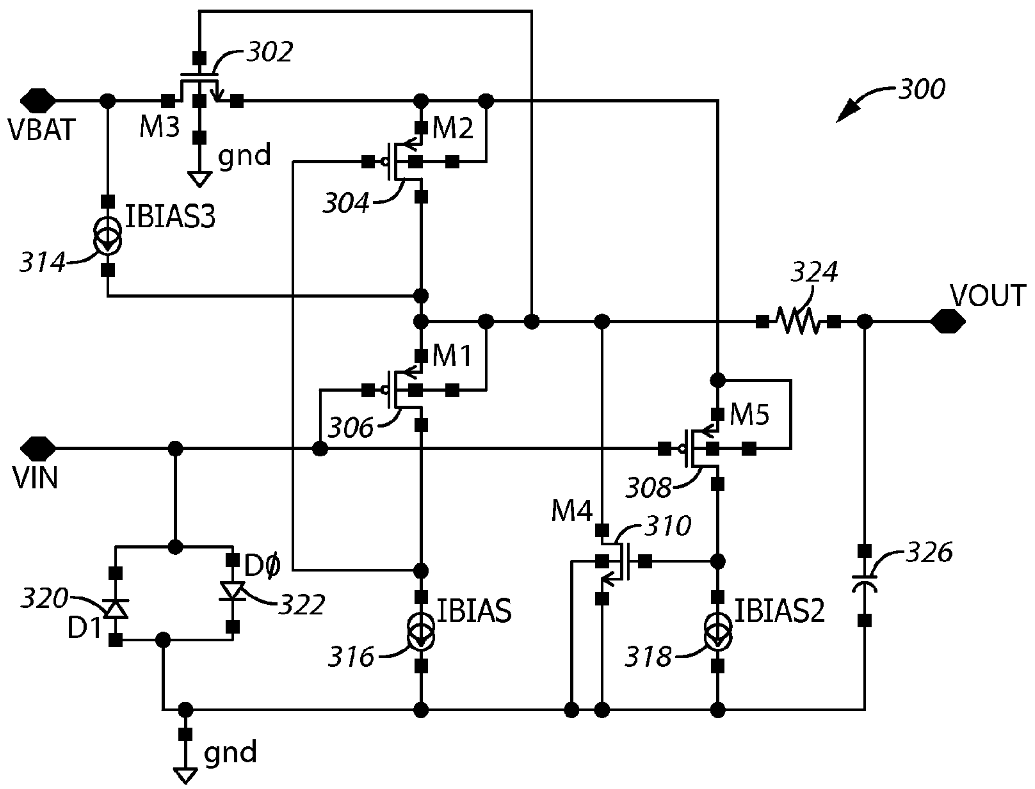
FIG. 3 is a circuit diagram of a buffer circuit.

Referring now to FIG. 3, one example of a buffer circuit 300 is described. The buffer circuit 300 includes a first transistor (M3) 302, a second transistor (M2) and a fifth transistor 310 (M4). A third or input transistor (M1) 306 functions as the input transistor. The function of the second transistor (M2) 304 is generally to drive the drain of the input transistor 306 (M1) via the feedback composed of the vgs of M2 and vgs of M3 and to provide a controlled conductance to the supply from VOUT to help provide additional source current demanded by the load. The function of a fourth transistor (M5) 308 is generally to sense changes in vgs of the transistor 306 (M1) and turn on transistor 310 (M4) when additional sinking current is needed by overdriving the current sink IBIAS2 and causing the vgs of transistor 310 (M4) to increase. The function of a fifth transistor (M4) 310 is generally to provide a low impedance path to ground from VOUT and sink additional current provided by the load.

The buffer circuit 300 also includes a first current source 314, (IBIAS3), a second current source 316, (IBIAS), a third current source 318 (IBIAS2), a first diode 320 and second diode 322 (that function to bias the input transistor 306 (M1) and forms a high pass filter with the motor capacitor as is the point of input into the buffer), and a resistor 324 and capacitor 326 (that function as a low pass filter). In some examples, the low pass filter can be omitted. In other examples, the first current source (IBIAS3) 314 can be omitted. Vin is at the gate of the third transistor 306 (the input transistor). Vbat (a battery voltage) is applied to the source of the first transistor (M2) 302 and the first current source (IBIAS3) 314.

The buffer circuit of FIG. 3 behavior can be described in two ways: the forward signal path VIN to VOUT and the reverse signal path at VOUT. The forward signal path provides a unity gain output signal at VOUT from input signal VIN which is created by the transducer motor in response to sound pressure changes.

The reverse signal path relates to changes in VOUT relative to VIN caused by changes in gate to source voltage (Vgs) of the input transistor (M1) 306 that occurs when additional load current is needed to either charge or discharge the LPF capacitor 326 or to source to sink current into another resistive and/or capacitive load.

The input transistor (M1) 306 provides the first impedance buffering of the capacitive motor transducer and is dc biased to ground by conventional anti parallel diode structure of diodes 320 and 322. The low noise current sink 316 (IBIAS) provides the quiescent bias current for the import transistor (M1) 306 and the feedback point for the gate of transistor 304 (M2). The current sources 314, 316, and 318 (IBIAS, IBIAS2, and IBIAS3) are implemented with low noise current mirrors that have the gate connection highly filtered to minimize noise and are represented in the figures by ideal current sources.

In the forward signal path VIN to VOUT with no additional load current needed and small input amplitudes, the Vgs of the transistors 306 (M1), 304 (M2), 302 (M3), 310 (M4), and 308 (M5) remains constant and VOUT is in phase and is a buffered copy of VIN. Under this constant current condition, the gate of the transistor 304 (M2) moves in phase with VOUT via the feedback loop encompassing the transistor 304 (M2) as well as the source of the transistor 304 (M2) and the transistor 302 (M3).

The output of the buffer, VOUT, is at the source of the input transistor 306 (M1) and is connected to the drain of the transistor 304 (M2) and the gate of the transistor 302 (M3). The source of the transistor 302 (M3) provides a low impedance connection to the source of the transistor 304 (M2) and provides isolation for the transistor 304 (M2) from the battery connection VBAT. This isolation allows the gate to source voltage of transistor 304 (M2)(Vgs) to remain constant while providing buffering of the gate to drain capacitance of the input transistor 306 (M1)(Cgd) which occurs when the drain node of the transistor 306 (M1) is moving in phase signal with VIN. The buffering of gate to source capacitance of the input transistor 306 (M1)(Cgs) allows for increasing the transistor area of the input transistor 306 (M1) without loading the motor and reducing the gain. The limit of increasing the area of input transistor 306 (M1) occurs when the output noise feedback through the gate to source capacitance of the input transistor 306 (M1)(Cgs) is greater contribution to the total noise than the flicker noise reduction of the input transistor 306 (M1). Depending on the size of the motor capacitance, the increase in the size of the input transistor 306 (M1) and decrease in noise can be substantial. In this case, a 2.5 pF motor capacitance allows the input transistor to be sized four times larger which gives greater than 1 dB integrated noise improvement.

The following description refers to drain to source voltages (Vds), drain to source saturation voltages (Vdsat), gate to source voltages (Vgs) and battery voltages (Vbat). M1(Vgs) refers to the gate to source voltage of the input transistor 306, and so forth.

As long as there is no additional current demand at VOUT other than quiescent biasing needs and the signal swing on the output is sufficiently small so that for the transistor 302 (M3) Vds>Vdsat) and for the transistor 304 (M2) Vds>Vdsat), the gate to source voltage for the transistor 302 (M3)(Vgs) and transistor 304 (M2)(Vgs) are constant which causes the drain of the input transistor 306 (M1) and the source of the transistor 304 (M2) to be level shifted versions of VOUT. The source of transistors 304/302 (M2/M3) is dc biased at the voltages (M1)(Vgs)+(M3)(Vgs), and the drain node of M1 is dc biased to M1(Vgs)+M3(Vgs)+M2(Vgs). VOUT, the source of M2/M3, and the drain of M1 move in phase with VIN for the forward signal path.

Another condition which can modulate M1(Vgs) occurs in the forward signal path when the signal is large enough so that either the IBIAS(Vds<Vdsat) or M2(Vds<Vdsat), M3(Vds<Vdsat). In these cases, the push-pull devices, transistors 310 (M4) and transistors 304/302 (M2/M3) sinks or sources, respectively, additional current to maintain M1(Vgs) in the same manner as it does for reverse path disturbances which maximizes the linear range of the buffer to nearly Vbat to around 100 mV above ground.

The reverse signal path is considered a disturbance, and the linearity of the buffer directly relates to the buffer's ability to provide additional source or sink currents so that the gate to source voltage of the input transistor 306 (M1)(Vgs) remains constant. If the voltage M1(Vgs) is allowed to modulate for changing load conditions, the linearity of the forward path will degrade.

In addition to providing the impedance buffering function for the microphone motor transducer in the forward signal path, the input transistor 306 (M1) acts as a common source amplifier which controls the pull current of transistors 304/302 M3/M2 for the reverse signal path. For large signal swings in the forward signal path, the gate of the transistor 304 (M2) is modulated by the input transistor 306 (M1)/IBIAS common source amplifier and modulated by M2(Vgs) to keep M1(Vgs) constant as it does with a reverse path load condition. Therefore, the modulation of M1(Vgs) from modulation of load current or modulations of M1(Vgs) due to large signal swings in the forward signal path result in the feedback loops that control the push-pull output devices to maintain a constant M1(Vgs). In this way the feedback network improves drive capability of the buffer and an increases linear range on the output.

The transistor 308 (M5) is part of the common source amplifier controlling the pull current device 310 (M4) and is used to provide additional sink currents to cancel the reverse signal path disturbance.

The sources of the transistor 304 (M2) and the transistor 308 (M5) are essentially at ac ground with respect to a signal that cause M1(Vgs) to modulate which is caused by charging or discharging a load. The source node is essentially ac ground since the M2(Vgs) and M5(Vgs) modulation due to a changing M1(Vgs) during a load disturbance is dominated by the gain at the gate of M2 provided by the common source amplifier formed from M1 and IBIAS. As noted, M1 only acts as an amplifier for changes in M1(Vgs) caused by load current changes and acts as a source follower in the forward signal path VIN to VOUT. The source of M5 can also be connected to VOUT with a proper resizing of M5 in order to detect M1(Vgs) changes. However, it is beneficial to tie M5 source to a higher level shifted version of VOUT so that the M1(Vgs) can be detected for larger negative excursions of VOUT. When VOUT negative excursions are large enough, the M5(Vgs) will start to decrease and the M5/IBIAS2 amplifier will begin to turn the pull device M4 back off which limits the linear range of the buffer in the negative signal range. For positive VOUT excursions, M5(Vgs) modulations due to signal amplitude are a less of concern, but may cause some cross over distortion. This distortion is not significant compared to slew rate limited distortion or clipping.

In this case, the M1(Vgs) is either increased or decreased as the load needs additional charging or discharging current. If additional load current needs to be sourced to the load, M1 (Vgs) decreases which causes M2(Vgs) and M3(Vgs) to increase as the impedance of the input transistor 306 (M1) decreases relative to the current source impedance of the current source 316 (IBIAS). The common source amplifier formed from the transistor 306 (M1) and current source 316 (IBIAS) operate in a closed loop with the transistors 304/302 (M2/M3) and the M2(Vgs) and M3(Vgs) will increase until M1(Vgs) is increased to the point that the quiescent M1(Vgs) is reached. This occurs when additional current is source through M3 and M2 to the load.

For changes in M1(Vgs) which occur from the load demanding additional sink current, the M1 (Vgs) increases which causes a decrease in M2(Vgs). The loop gain of the common source amplifier formed from the input transistor 306 (M1) and current source 316 (IBIAS), and push device transistor 304 (M2) is sufficiently high to offset the increase in M3(Vgs) which would tend to increase M2(Vgs) in this case.

Changes in the source node of M2 relative to VOUT caused by increased load sink requirements, cause the common source amplifier formed from the transistors 308 (M5) and the second current source 318 (IBIAS2) to increase M4(Vgs). This causes additional sink current to discharge the load and the closed loop operation of the transistor 308 (M5), current source 318 (IBIAS2) current sink, and the transistor 310 (M4) pull device cause the sink current to increase until the M1(Vgs) is reduced to the quiescent value.

The closed loop operation of the pull and push current control keeps the M1(Vgs) to remain constant for a wide current load variation which makes the buffer output highly linear for large amplitudes and higher frequencies which occur at ultrasonic frequencies above the LPF corner during ultrasonic disturbances.

The current source 314 (IBIAS3) is a preferred addition to the source current circuitry of the transistors 302/304 (M3/M2) and helps set the dc part of the source current with a low noise current source. The transistors 302/304 (M3/M2) then provides the remainder of the bias sink currents of IBIAS and the drain to source current of the transistor 310 (M4)(Ids). This is done to optimize noise in the same way that the current source 316 (IBIAS) provides the majority of dc bias sink current and the transistor 310 (M4) provides the additional load currents necessary to keep the gate to source voltage of the input transistor 306 (M1)(Vgs) constant, and therefore, the buffer output linear.

Further optimization for noise is made by operating the transistor 310 (M4) in cutoff during periods of operation where additional sink current is unneeded at the expense of increased distortion in non loaded situations due to crossover distortion. Likewise, IBIAS can be maximized to minimize the current in the transistors 302/304 (M2/M3) for situations that do not require additional source current to the load.

Preferred embodiments of the disclosure are described herein, including the best mode known to the inventors. It should be understood that the illustrated embodiments are exemplary only, and should not be taken as limiting the scope of the appended claims.

What is claimed is:

1. A buffer coupled to an acoustic motor, the buffer having an input and an output, the input having an input voltage and the output having an output voltage, the buffer being coupled to a load, the buffer comprising:

an input transistor having a gate, a source, and a drain, the input transistor having a gate-to-drain capacitance, the input transistor also having an area;

push-pull transistor circuitry coupled to the input transistor;

wherein under a first set of operating conditions, a gate to source voltage of the input transistor remains constant and the output voltage is a buffered copy of the input voltage;

wherein under a second set of operating conditions, the push-pull transistor circuitry selectively sinks or sources additional current to the load so that linearity of buffer operation is provided;

such that the gate-to-drain capacitance of the input transistor is buffered allowing the area of the input transistor to be increased without reducing the gain of the motor.

2. The buffer of claim 1 wherein the motor comprises a diaphragm and back plate and converts sound energy into an electrical signal.

3. The buffer of claim 1 wherein the input transistor is biased to ground.

4. The buffer of claim 3 wherein the input transistor is biased to ground using one or more diodes.

5. The buffer of claim 1 wherein the push-pull circuitry comprises a plurality of transistors.

6. The buffer of claim 1 wherein in the first set of operating conditions the input voltage is in phase with the output voltage of the buffer.

7. The buffer of claim 1 wherein the input transistor is electrically isolated from a battery voltage.

* * * * *